United States Patent [19]

Kahle

[11] Patent Number: 4,870,435
[45] Date of Patent: Sep. 26, 1989

[54] MULTIPLE LENS IMAGE ROTATION SYSTEM

[75] Inventor: Todd Kahle, Hartford, Wis.

[73] Assignee: Xidex Corporation, Palo Alto, Calif.

[21] Appl. No.: 194,193

[22] Filed: May 16, 1988

[51] Int. Cl.⁴ .............................................. G03B 21/22
[52] U.S. Cl. ...................................... 353/101; 353/81
[58] Field of Search ................... 353/81, 101, 100, 25, 353/26 R, 26 A, 27 R, 27 A, 22, 23, 24

[56] References Cited

U.S. PATENT DOCUMENTS

| | | | |
|---|---|---|---|
| 2,548,554 | 4/1951 | Nivison et al. | 353/81 X |
| 2,937,569 | 5/1960 | Wilton | 353/81 |
| 3,981,574 | 9/1976 | Jesensky | 353/101 |
| 4,163,611 | 8/1979 | Hall | 353/101 |
| 4,494,840 | 1/1985 | Toeppen | 353/101 |
| 4,710,004 | 12/1987 | Verhaagen | 353/101 |

FOREIGN PATENT DOCUMENTS 0083619 7/1978 Japan ................................... 353/101

Primary Examiner—Harry N. Haroian
Attorney, Agent, or Firm—Mason, Kolehmainen, Rathburn & Wyss

[57] ABSTRACT

A multiple lens image rotation system includes an elongated base fixedly mounted to a microfilm reader apparatus having a plurality of projection lenses with different magnification levels on a carrier movably mounted with respect to the base. The carrier is adapted to move along an axis generally parallel to the longitudinal axis of the base defining a first position wherein one projection lens is aligned with an image projection path and a second position and subsequent positions wherein other projection lenses are aligned with the image projection path. A single image rotation prism is rotatably mounted in the image projection path for use with the plurality of projection lenses one at a time. The image rotation prism is adapted to rotate about an axis generally coaxial with the image projection path.

57 Claims, 6 Drawing Sheets

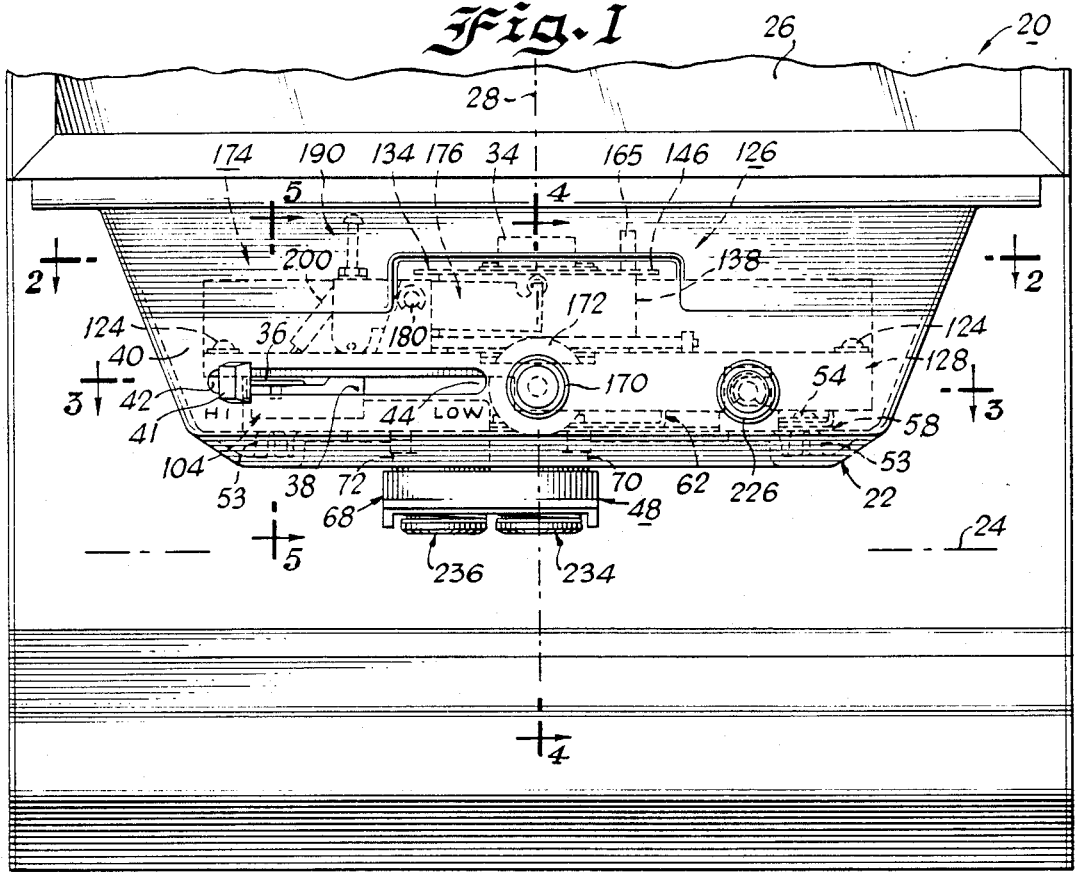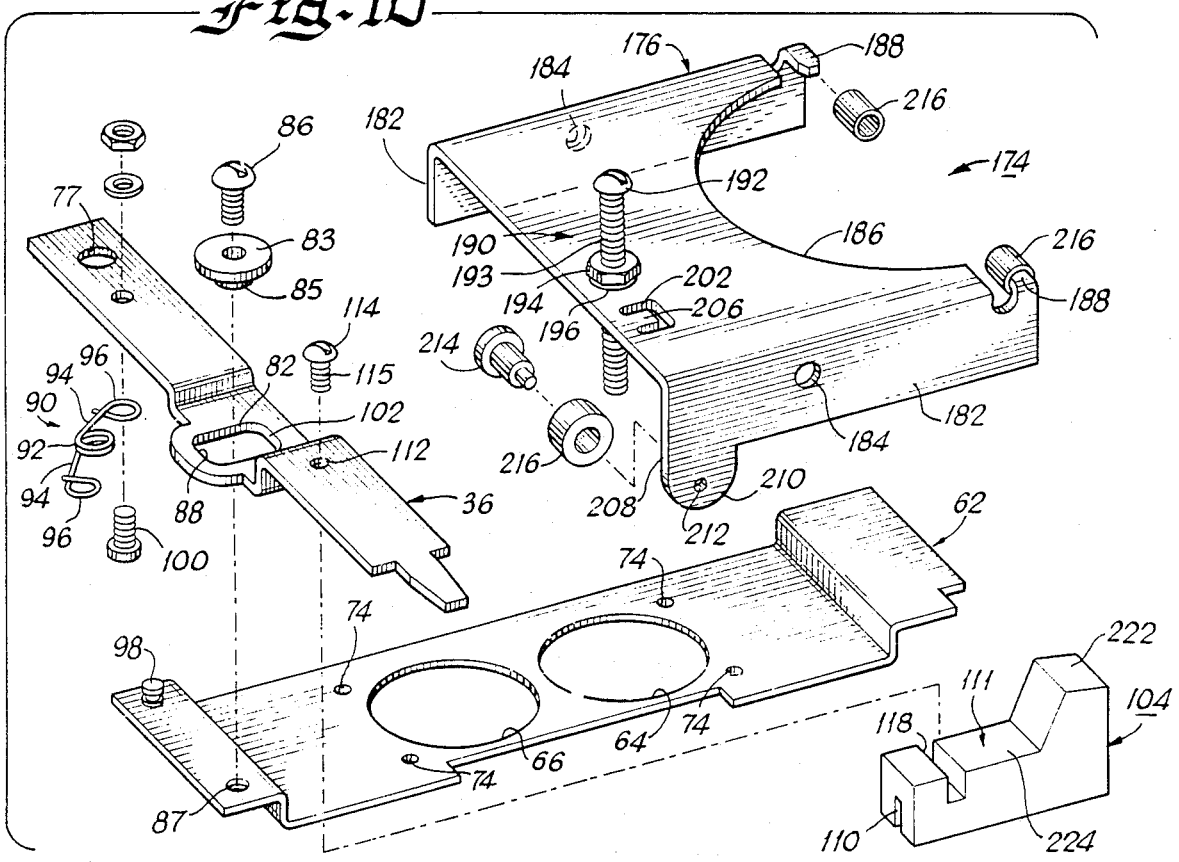

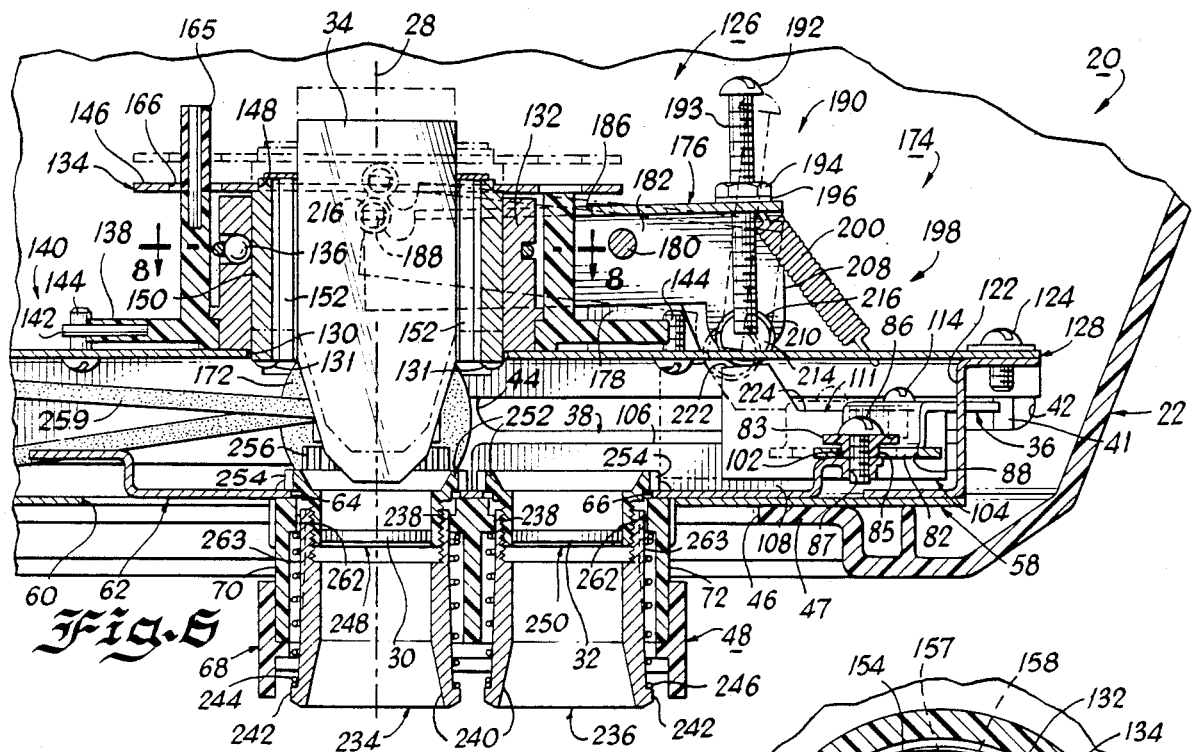
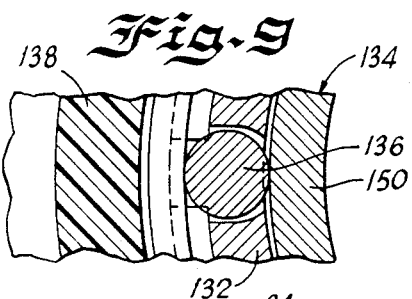
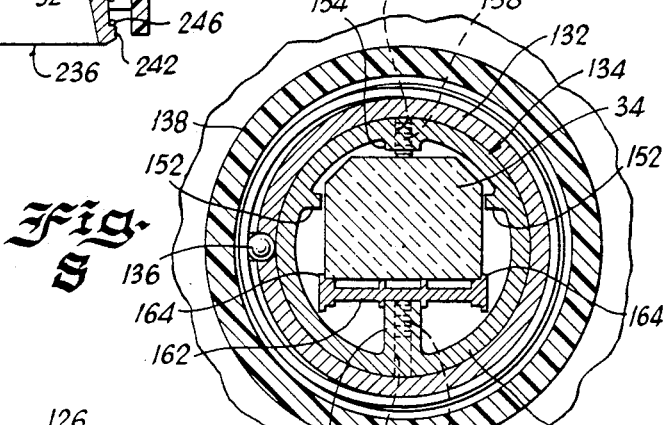
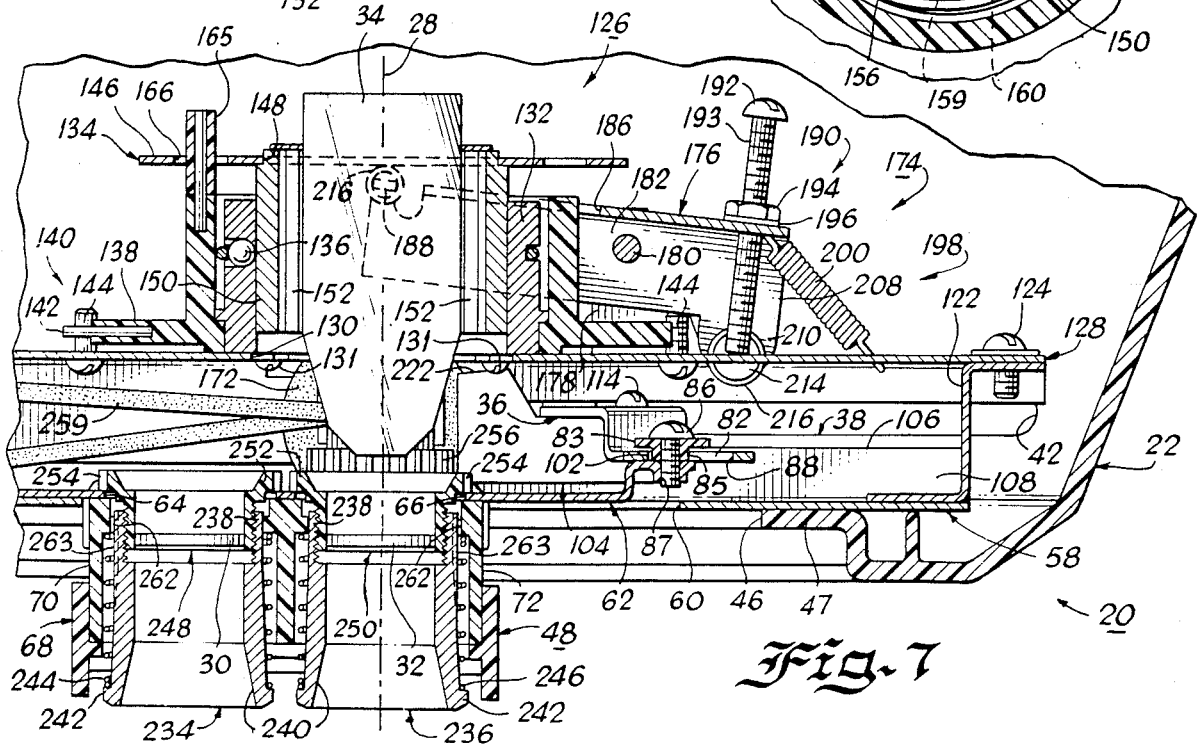

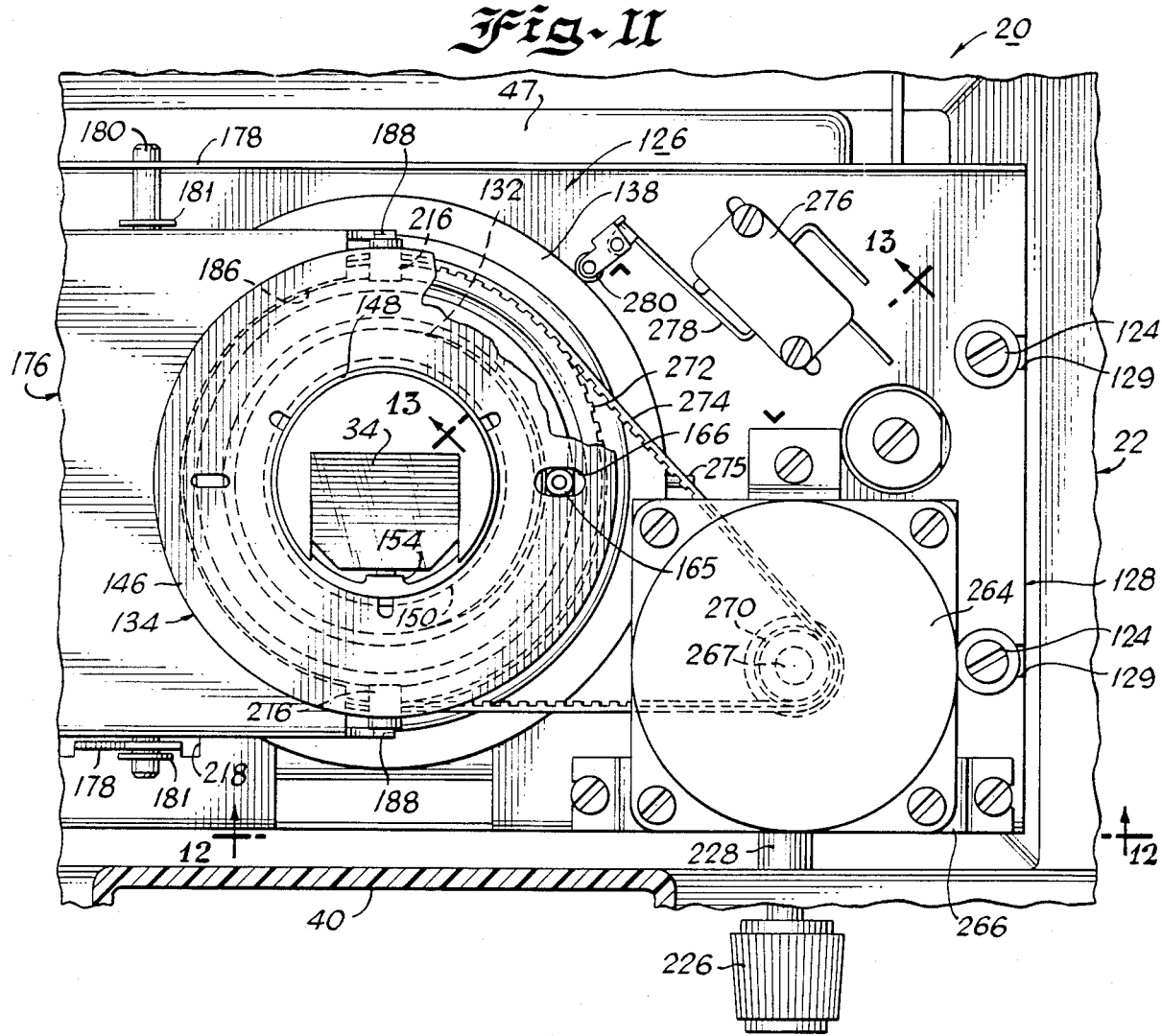
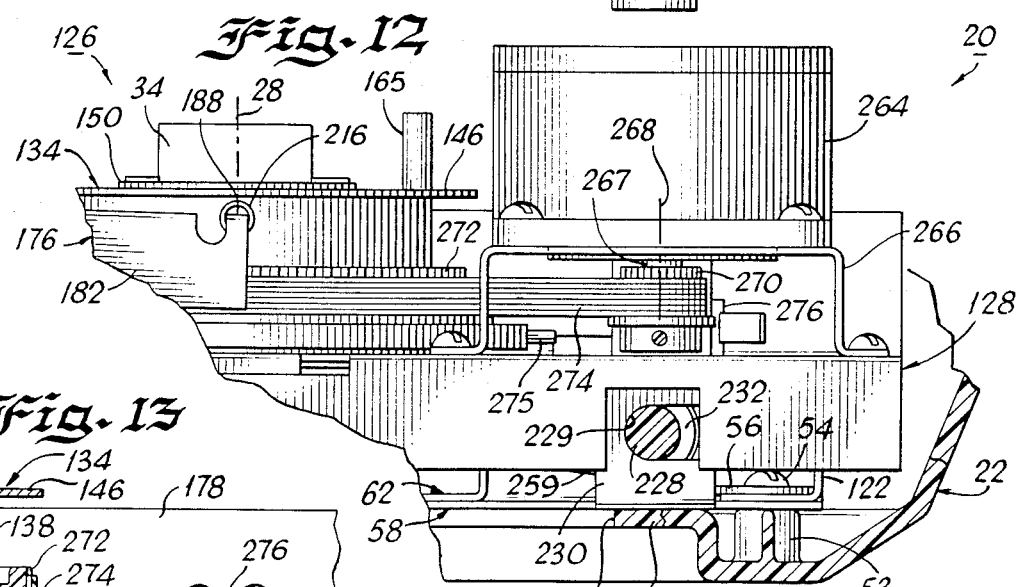
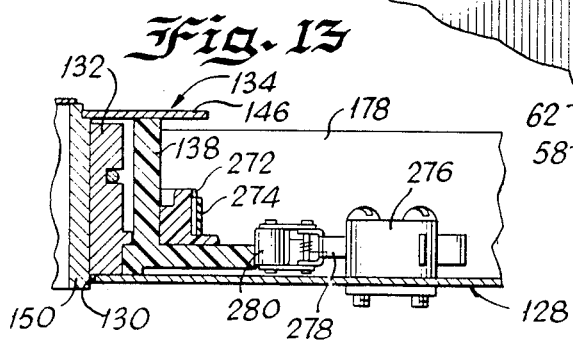

MULTIPLE LENS IMAGE ROTATION SYSTEM

BACKGROUND OF THE INVENTION

1. Field of the Invention

This invention generally relates to a microfilm reader apparatus for viewing microimages disposed on microfilm and the like and, in particular to a microfilm reader apparatus having a plurality of magnification lenses which cooperate with a single image rotation prism.

2. Description of the Prior Art

Many documents are microfilmed using various types of microfilm cameras, such as a planetary microfilm camera. Some documents which contain a voluminous amount of printed information may have to be photographed at a relatively high magnification level, resulting in the printed images being relatively small when projected. Thus, many microfilm reader apparatus are provided with two or more projection lenses to enable the projection of images at various magnification levels. When viewing microfilmed documents containing relatively small images, the operator merely switches to a relatively high magnification level lens to view the desired microimage.

Some reader printer apparatus are used primarily with microfilm or microfiche wherein the images are disposed parallel to the major axis of the frames. In such apparatus, the images are printed parallel to the long edge of the paper to avoid a portion of the image being cut-off. An example of such a machine is disclosed in copending U.S. patent application, Ser. No. 07/104,358 filed on Oct. 2, 1987, assigned to the same assignee as the present application. However, such apparatus may also be used with microfilm or microfiche wherein the images are disposed parallel to the minor axis of the frame. In this case, it is necessary to rotate the image ninety degrees such that the image is printed along the short edge of the paper.

Another problem resulting from the microfilming of documents is that the document may be skewed when photographed. This results in the microimage being skewed with respect to the edge of the microfilm. Accordingly, when the microfilm is inserted into a microfilm reader apparatus, a skewed image will appear on the viewing screen. Even though the image may still be read, it may be awkward for an operator. Moreover, sometimes the image is photographed upside down. To alleviate these problems, an image rotation prism is provided and disposed within an image projection path which cooperates with the projection lenses to provide an upright image at the desired magnification level on the viewing screen.

Since the prism will invert an image in the image projection path in the similar manner as a mirror, it is important that the prism be utilized with all of the projection lenses. In prior art apparatus, this was accomplished by providing a plurality of prisms and associating one prism with each of the projection lenses. Such an arrangement is disclosed in U.S. Pat. No. 4,494,840. In that patent, two projection lenses are provided with an image rotation prism positioned directly above each projection lens. The assembly of the projection lenses and prisms are movably mounted with respect to the image projection path such that one projection lens and associated prism can be moved into the image projection path at a time. Gears are provided such that rotation of either prism will cause identical rotation of the other prism such that the image is rotated by an identical amount regardless of which projection lens is disposed in the image projection path.

One of the problems associated with such a system as disclosed in U.S. Pat. No. 4,494,840, is that it requires the use of two image rotation prisms which are generally expensive and thus add to the overall cost of the device. Also, such a system is relatively more complicated since it requires a gearing arrangement between the two prisms to cause both prisms to be rotated by an identical amount.

SUMMARY OF THE INVENTION

It is an object of the present invention to solve the problems associated with the prior art.

It is another object of the present invention to provide a reader apparatus with a multiple lens image rotation system relatively less complicated than the prior art.

It is yet another object of the present invention to provide a multiple lens image rotation system which uses a single image rotation prism.

In summary, the invention relates to a multiple lens image rotation system for an apparatus for viewing microimages recorded on microfilm, microfiche, aperature cards, and the like. The multiple lens rotation system image rotation system includes an elongated base fixedly mounted with respect to the reader apparatus and a plurality of projection lenses having different magnification levels movably mounted on a carrier with respect to the base. The carrier is adapted to move along an axis generally parallel to the longitudinal axis of the base defining a first position, wherein one projection lens is aligned with the image projection path and a second position and subsequent positions where the other lenses are aligned with the image projection path. A single image rotation prism is rotatably mounted in the image projection path for use with all of the projection lenses. The image rotation prism is adapted to rotate about an axis generally coaxial with the image projection path.

BRIEF DESCRIPTION OF THE DRAWING

These and other objects and features of the present invention will become better understood from the following description with reference to the accompanying drawing, in which:

FIG. 1 is a partial front elevation microfilm reader apparatus having a multiple lens image rotation system in accordance with the present invention;

FIG. 6 is a cross-sectional view along line 6—6 of the multiple lens image rotation system of FIG. 4;

FIG. 7 is a cross-sectional view of the multiple lens image rotation system of FIG. 4;

FIG. 8 is a plan sectional view along line 8—8 of the multiple lens image rotation system of FIG. 6;

FIG. 9 is an enlarged fragmentary view of FIG. 8;

FIG. 10 is an exploded perspective view of various parts of the multiple lens image rotation system in accordance with the present invention;

FIG. 11 is a partial plan sectional view, of an alternate embodiment of a multiple lens image rotation system having a drive motor for rotating the image rotation prism in accordance with the present invention;

FIG. 12 is a partial cross-sectional view along line 12—12 of the multiple lens image rotation. system of FIG. 11; and FIG. 13 is a partial cross-sectional view along line 13—13 of the multiple lens image rotation system of FIG. 11.

DETAILED DESCRIPTION

Figure 2:
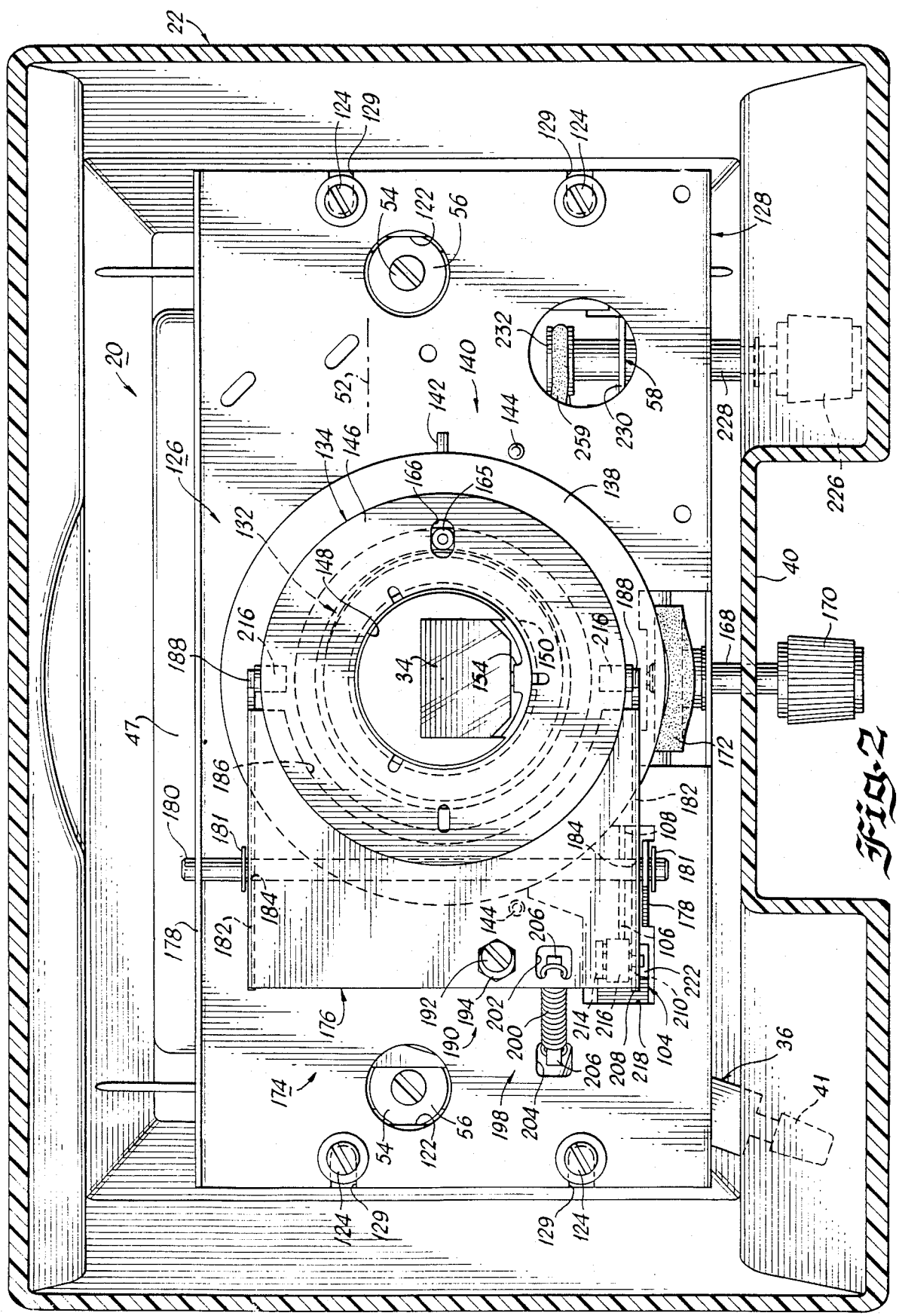
FIG. 2 is a plan sectional view along line 2—2 of the multiple lens image rotation system of FIG. 1.

Referring to the drawing and, in particular to FIG. 1, the multiple lens image rotation system in accordance with the present invention is generally identified by the reference numeral 20. The system 20 includes a housing or bezel 22, fixedly mounted to the microfilm reader apparatus. The bezel 22 is generally mounted in a spaced-apart relationship above an object plane 24. The object plane 24 is the plane in the microfilm reader apparatus in which the microfilm is received for viewing microimage thereon on a viewing screen 26 (FIG. 1). Although it is not shown in the drawing, it will be understood by those in the art that a lamp and an optic system including one or more mirrors are used to project the microimage from the object plane 24 onto the viewing screen 26. The lamp and the optic system are generally not a part of the present invention except for that portion defined as the image projection path 28. The image projection path 28 is generally perpendicular to the object plane 24 and defines an optical path through a projection lens and an image rotation prism.

The principles of the present invention apply to various microfilm reader apparatus having a plurality of projection lenses. However, for illustration purposes, only two projection lenses 30 and 32 will be discussed. For discussion purposes the projection lens 30 will be designated as having a relatively higher magnification level than the projection lens 32.

Moreover, the word "microfilm" is used throughout. It will be appreciated by those of ordinary skill in the art that the principles of the present invention are applicable to all types of microforms which contain one or more microimages including microfilm, microfiche aperture cards and the like.

The projection lenses 30 or 32 are adapted to be aligned with an image rotation prism 34 coaxially disposed with the image projection path 28 by a lens selection lever 36 which extends through an elongated slot 38 in a front face 40 of the bezel 22. A control knob 41 is provided on the portion of the selection lever 36 which extends outwardly from the bezel 22 to facilitate operation of the lens selection- lever by an operator. As shown best in FIG. 1, the lens selection lever 36 is adapted to move horizontally within the elongated slot 38 between a first or left hand position 42 and a second or right hand position 44. The left hand position 42 is defined as the relatively high magnification level, while the -right hand position 44 is defined as the relatively lower magnification level. Thus, by placing the lens selection lever 36 in the left hand position 42, the projection lens 30 is placed in the image projection path 28. Similarly, when the selection lever 36 is placed in the right hand position 44, the projection lens 32 is placed in the image projection path 28.

Figure 4:
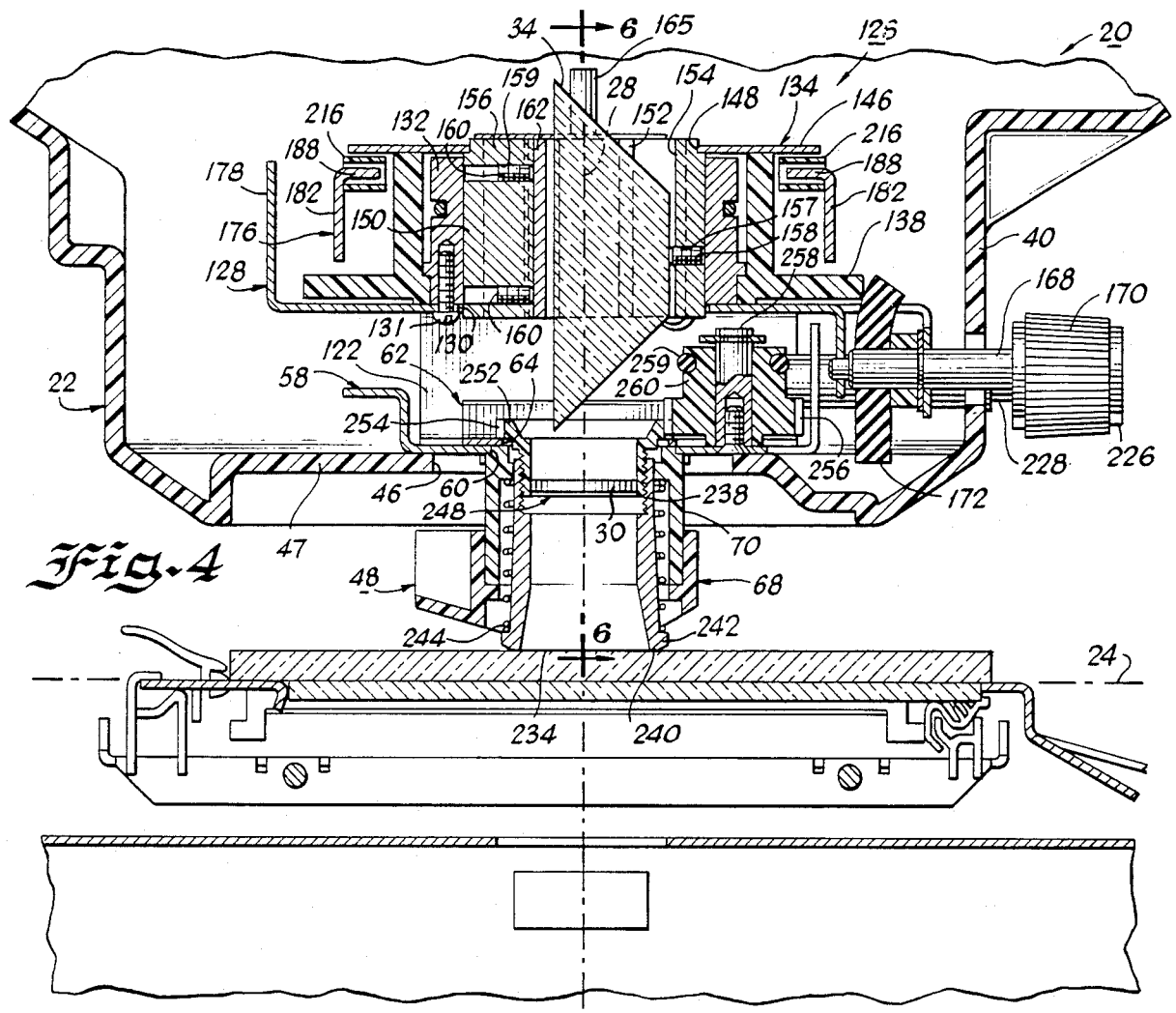
FIG. 4 is a cross-sectional view along line 4—4 of the multiple lens image rotation system of FIG. 1.
Figure 5:
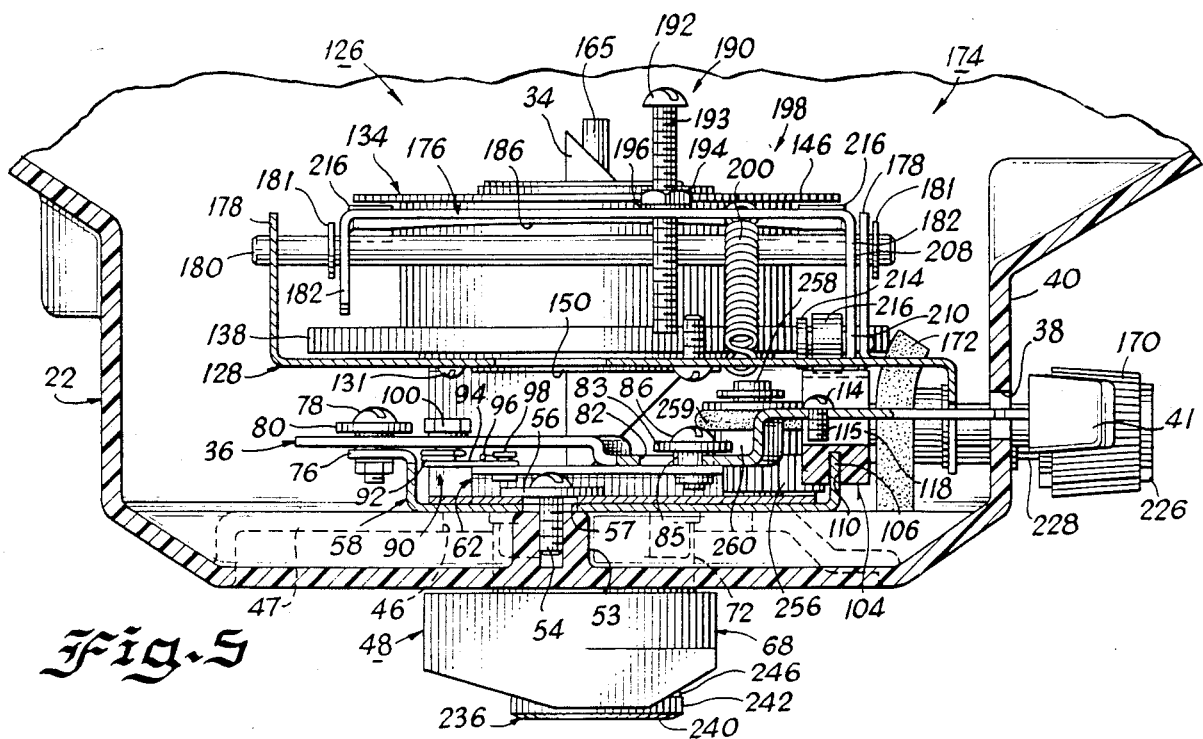
FIG. 5 is a cross-sectional view along line 5—5 of the multiple lens image rotation system of FIG. 1.

As best shown in FIG. 4, an aperture 46 is provided on the bottom surface 47 of the bezel 22 for receiving a projection lens assembly 48. The aperture 46 is generally rectangular in shape and is disposed such that its longitudinal axis 50 is generally parallel to the longitudinal axis 52 of the bezel 22. The aperture 46 is sized to allow the projection lens assembly 48 to move in a direction generally parallel to the longitudinal axis 50 of the bezel 22 from a first position wherein the projection lens 30 is aligned with the image projection path 28 and a second position wherein the projection lens 32 is aligned with the image projection path 28.

The interior side of the bottom face 47 of the bezel 22 is provided with a plurality of integrally formed posts 53 with threaded apertures for receiving fasteners 54 and cooperating washers 56 to secure the multiple lens image rotation system 20 to the bezel 22. More particularly, the multiple lens image rotation system 20 includes an elongated base or chassis 58, fixedly mounted to the bezel 22. The elongated base 58 contains a plurality of apertures 57 for receiving the fasteners 54 to secure the elongated base 58 to the bezel 22.

The elongated base 58 is provided with a generally rectangular aperture 60 adapted to communicate with the rectangular aperture 46 in the bottom of the bezel 22. The projection lens assembly 48 extends downwardly through the aperture 60 and the aperture 46.

The projection lens assembly 48 includes a first plate or carrier 62 having a generally rectangular shape. The plate 62 is movably mounted with respect to the elongated base 58 and includes a pair of apertures 64 and 66 (FIGS. 6, 7 and 10) for cooperating with the projection lenses 30 and 32, respectively.

The projection lens assembly 48 further includes a lens holder assembly 68. The lens holder assembly 68 is integrally molded and includes a pair of cylindrical portions 70 and 72. The side wall of the cylindrical portions 70 and 72 are axially joined forming a common side wall. The cylindrical portions 70 and 72 are disposed contiguous to each other such that their longitudinal axes are generally parallel to each other. The lens holder assembly 68 is aligned with apertures 64 and 66 and attached to the bottom side of the movable plate 62 by suitable fasteners 75 through a plurality of apertures 74 disposed in a spaced-apart relationship on the movable plate 62.

The lens selection lever 36 is used to move the movable plate 62 and the lens holder assembly 68 with respect to the elongated base 58. As shown best in FIG. 3, the lens selection lever 36 is shown in solid lines in a first position 89 which for discussion purposes has been designated as a high magnification position. The low magnification position 91 of the lens selection lever 36 is shown in phantom in dotted lines. The lens selection lever 36 is pivotably mounted to a horizontally extending ear 76 integrally formed with the elongated base 58. The lens selection lever 36 includes an aperture 77 for receiving a shouldered washer 80. The washer 80 is secured to the ear 76 by a fastener 78.

An integrally formed, generally rectangular aperture 82 is disposed intermediate the ends of the lens selection lever 36. A shouldered washer 83 having a reduced diameter portion 85 is positioned within the aperture 82 and secured to the movable plate 62 by a fastener 86 which is received into a threaded aperture 87 in the plate 62.

Figure 3:
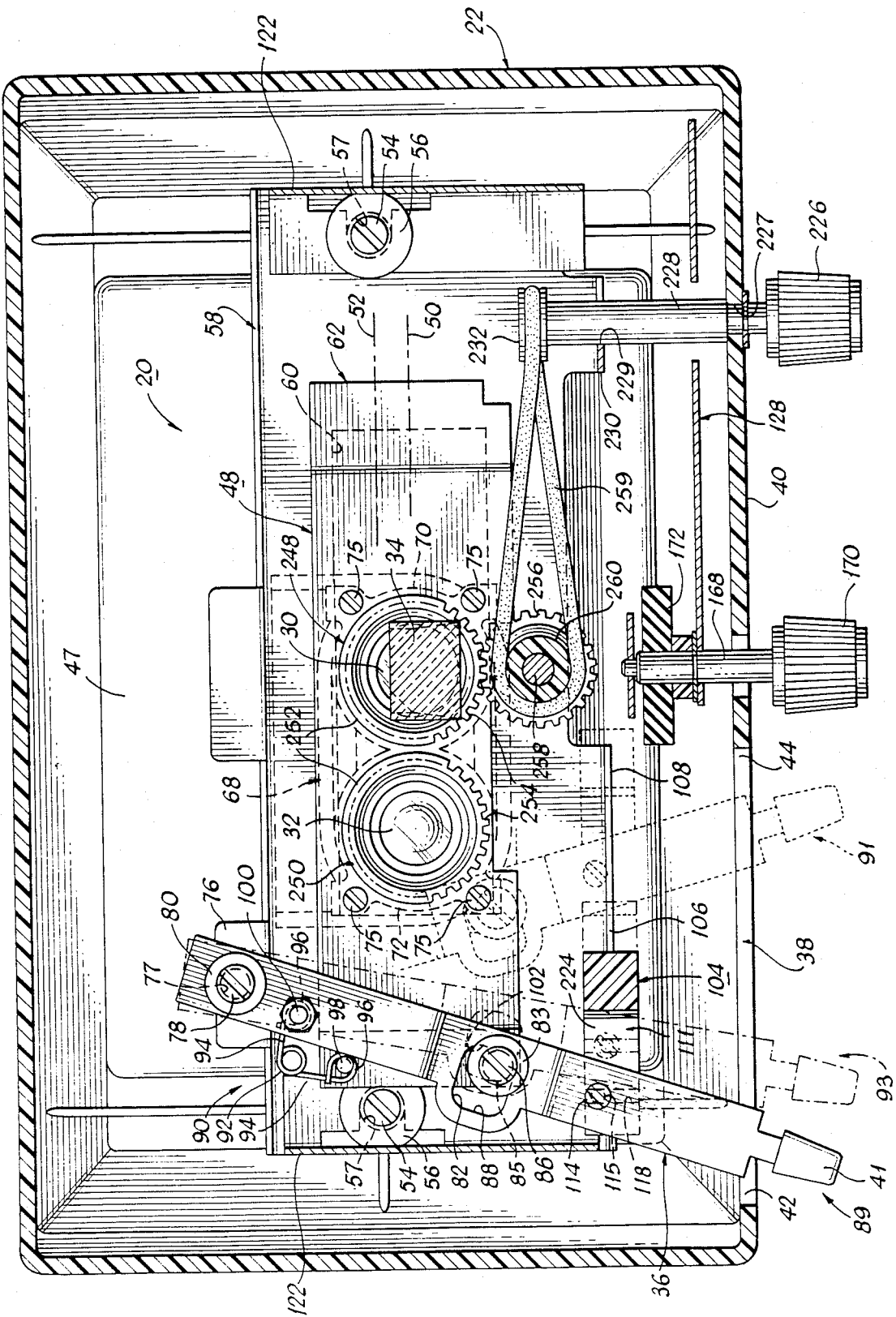
FIG. 3 is a plan sectional view along line 3—3 of the multiple lens image rotation system of FIG. 1.

An important aspect of the invention relates to the fact that there will be no movement of the movable plate 62 from the first position 89, illustrated in solid line in FIG. 3, toward the second position 91, illustrated in phantom in dotted lines in FIG. 3, until the shank 85 of the washer 83 abuts against the left hand wall 88 of the slot 82. In other words, the movable plate 62 will not be displaced by the initial movement of the lens selection lever 36 until the lens selection lever 36 is displaced from the intermediate position 93; shown in FIG. 3 phantom in alternating dashes and dots. Similarly, when the lens selection lever 36 is moved from the second position 91 toward the first position 89, movement of the movable plate 62 toward the left will cease when the lens selection lever 36 reaches the intermediate position 93. Thus, there is no movement or displacement of the movable plate 62 in either direction when the lens selection lever 62 is between the first position 89 and the intermediate position 93.

After the lens selection lever 36 is moved from the second position 91 to the first position 89, a biasing means 90 biases the lens selection lever 36 toward the intermediate position 93. The biasing means 90 is comprised of a spring 92 having extending arms 94. Each end of the arms 94 are formed into loops 96 for receiving fasteners 98 and 100 secured into apertures in the movable plate 62 and the lens selection lever 36, respectively. The biasing means 90 biases the lens selection lever 36 toward the intermediate position 93 such that the shank 85 of the washer 83 abuts the left hand wall 88 of the slot 82. Movement of the lens selection lever 36 towards the second position 91 causes the movable plate 62 to move to the right. After the selection lever 36 reaches a position of maximum travel to the right wherein the left wall 88 of the slot 82 is no longer in contact with the shank 85 of the washer 83, the biasing means 90 causes the movable plate 62 to travel an additional distance to the second position 91. In the second position 91, the shank 85 of the washer 83 abuts a right hand wall 102 of the slot 82.

The lens selection lever 36 is also coupled to a cam 104 which rides along a track 106. The track 106 may be integrally formed with the elongated base 58 by providing an upwardly bent wall along a portion of one edge 108 of the elongated base 58. The cam 104 is provided with a longitudinal groove 110 along its bottom surface and is adapted to slidingly receive the track 106 to allow the cam 104 to freely slide back and forth.

The cam 104 is comprised of a relatively flat portion 111 which is coupled to the lens selection lever 36. A fastener 114 is screwed into the threaded aperture 112 such that the shank 115 of the fastener 114 extends downwardly from the bottom surface of the lens selection lever 36. The extending shank 115 is received into a groove 118 on the top of the cam 104. Once the cam 104 is disposed along the track 106 and the shank 115 captured within the groove 118, movement of the lens selection lever 36 will cause movement of the cam 104 along the track 106.

An important aspect of the invention relates to the fact that the above arrangement will allow the lens selection lever 36 (when displaced away from the first position 89) to move the cam 104 along the track 106 a predetermined distance without moving the movable plate 62. As will be described in more detail below, movement of the cam 104 causes an image rotation prism 34 to be raised prior to movement of the movable plate 62 in the direction toward the second position 91. This is a relatively important aspect of the invention because in the first position 89, the image rotation prism 34 extends downwardly into the lens holder assembly 68 as shown in FIG. 6. If the image rotation prism 34 was not lifted beforehand, movement of the movable plate 62 from the first position 89 toward the second position 91 would be restricted because of the interference and possibly cause damage to the prism 34.

As shown in FIGS. 3, 6 and 7, elongated Z-shaped brackets 122 are disposed along opposite edges of the elongated base 58. The Z-shaped brackets 122 are provided with a plurality of threaded apertures (not shown). The apertures are adapted for receiving fasteners 124 for fastening a prism rotation and lift assembly 126 to the Z-brackets 122. The prism rotation and lift assembly 126 includes a second plate 128 having notches or apertures 129 which are adapted to be aligned with threaded apertures (not shown) in the Z-brackets 122. The fasteners 124 are received through the apertures 129 in the second plate 128 to secure the prism rotation and lift assembly 126 to the Z-shaped brackets 122 to hold the plate 128 in a spaced-apart relationship from the elongated base 58.

The prism rotation and lift assembly 126 is adapted to carry the image rotation prism 34 in an aligned relationship with the image projection path 128. The rotation and lift assembly 126 also allows the image rotation prism 34 to be rotated about an axis, coaxial with the image projection path 28.

The second plate 128 is provided with a generally centrally disposed aperture 130. A first collar or sleeve 132 is aligned with the aperture 130 and fixedly mounted to the second plate 128 with suitable fasteners 131. The collar 132 forms a bearing for a prism mount assembly 134. A spring loaded ball 136 is disposed in an interior portion of the collar 132 and extends slightly inwardly from the surface for engaging the prism mount assembly 134 and biasing the assembly 134 to one side to compensate for the slack resulting from the tolerances between the collar 132 and the prism mount assembly 134.

A second collar 138 is rotatably mounted to the second plate 128, and surrounds the first collar 132. Means 140 are provided for limiting the rotational displacement of the second collar 138. More specifically, a pin 142 is disposed on the outer periphery surface of the second collar 138 and extends radially outwardly. The pin 142 cooperates with one or more vertically mounted stationary posts 144. As shown in FIG. 2, the arrangement of the posts 144 allow about 220° of rotation of the second collar 138. The posts 144 may be formed by providing threaded apertures in the plate 128 and screwing fasteners in from the bottom side of the plate 128.

As shown in FIGS. 7 and 8, the prism mount 134 is comprised of a flat disc like member 146 having a centrally disposed aperture 148. An elongated sleeve 150 is disposed within the aperture 146 such that the sleeve 150 is relatively flush with the disc 146 and extends downwardly from the bottom surface. The sleeve 150 is fixedly connected to the disc 146. The sleeve 150 is provided with a pair of oppositely disposed integrally formed ribs 152 for guiding a pair of opposing sides of the prism 34 into proper mounting position. As shown in FIG. 8, the ribs 152 do not contact the image rotation prism 34.

Another pair of integrally formed ribs 154 and 156 are disposed to secure other opposing surfaces of the image rotation prism 34. The ribs 154 and 156 are integrally formed on the interior surface of the elongated sleeve 150 and are disposed generally parallel to each other and parallel to the longitudinal axis of the sleeve 150.

The rib 154 is provided with one or more threaded radial apertures 157 for receiving set screws 158. The rib 156 is also provided with one or more radial apertures 159 for receiving set screws 160. The set screws 158 and 160 are screwed into the apertures 157 and 159, respectively, until they engage the surface of the image rotation prism 34.

A plate 162 having the same relative length as the sleeve 150 is disposed generally perpendicular to the rib 156. The plate 162 is provided with lips 4 for receiving the bottom surface of the image rotation prism 34. When the set screws 160 are tightened, the plate 162 is tight against the image rotation prism 34 thus securing the image rotation prism 34 in prism mount assembly 134.

The sleeve 150 of the prism mount assembly 134 is rotatably received in the first collar 132 such that the image rotation prism 34 extends downwardly from the second plate 128. The disc portion 146 of the prism mount assembly 134 is provided with a relatively larger diameter than the outside diameter of the second collar 138 to stop downward movement of the prism mount assembly 134 with respect to the sleeve 150.

In order to cause rotation of the prism mount assembly 134 when the second collar 138 is rotated, a post 165 is provided on the collar 138 which extends axially outwardly from the top of the second collar 138. The post 165 is received into an aperture 166 provided in the disc portion 146 of the prism mount assembly 134. Thus, when the second collar 138 is rotated, the prism mount assembly 134 will also rotate.

A prism rotation shaft 168 is rotatably mounted to the second plate 128 and disposed to be generally perpendicular to the image projection path 28. The image rotation shaft 168 extends outwardly from the front face 40 of the bezel 22. A control knob 170 is provided on one end of the shaft 168 to facilitate rotation. A resilient disc 172 is disposed intermediate the other end of the shaft 168 such that a portion of one side of the resilient disc contacts or engages the outer periphery of the second collar 138. The resilient disc 172 is fixedly mounted with respect to the shaft 168 such that it rotates in unison with the shaft 168 and corresponding knob 170. Thus, by rotating the shaft 168, the resilient disc 172 causes rotation of the second collar 138.

As heretofore stated, when the relatively high magnification projection lens 30 has been selected, a portion of the image rotation prism 34 extends into the lens holder assembly 68, which unless lifted, would interfere with lateral movement of the movable plate 62. Thus, means 174 are provided for lifting the prism mount assembly 134 upwardly before the movable plate 62 is moved from a first position 89 to the second position 91. The lifting means 174 includes a third plate 176 pivotably mounted to the second plate 128. More specifically, the second plate 128 is provided with a pair of spaced-apart, upwardly extending ears 178. Aligned apertures (not shown) are provided in the extending ears 178 defining a pivot axis for the third plate 176. The apertures are adapted to receive an axle 180.

The third plate 176 is formed with oppositely disposed and downwardly extending edges 182. The edges 182 are provided with apertures 184 which are adapted to be aligned with the apertures in the extending ears 178 such that the axle 180 can be received therethrough. The axle 180 is secured in place by C-clips 181. The third plate 176 is provided with a notch 186 which partially surrounds the second collar 138. Lifting arms 188 integrally formed with the third plate 176 are disposed at opposite ends of the notch 186. The lifting arms 188 are adapted to be received underneath the disc portion 146 of the prism mount assembly 134. Thus, as shown in FIG. 7, when the third plate 176 is rotated in a clockwise direction, the prism mount assembly 134 is displaced in an upward direction. Similarly, when the third plate 176 is rotated in a counterclockwise direction, the prism mount assembly 134 is allowed to move downwardly by gravity and abut the top surface of the second collar 138 as shown in FIG. 6.

Pivotal movement of the third plate 176 may be restricted by an adjustable stop 190. The adjustable stop 190 may be formed by providing a threaded aperture (not shown) in the third plate 176 intermediate the end opposite the lifting arms 188. A fastener 192 having an elongated shank 193 may be screwed into the threaded aperture until a portion of the shank 193 extends downwardly from the bottom surface of the third plate 176. The extending shank 193 will contact the top surface of the second plate 128 after a predetermined amount of rotation in a clockwise direction (as viewed in FIG. 7). In order to lock the adjustment of the stop 190, a nut 194 and corresponding lock washer 196 may be provided which can be tightened against the top surface of the third plate 176 to secure the fastener 192 in place.

Biasing means 198 are provided to bias the third plate 176 in a clockwise direction. More specifically, the biasing means 198 biases the third plate 176 causing the extending shank 193 of the fastener 192 to contact the top surface of the plate 128. The biasing means 198 may be provided by mounting a coil spring 200 and attaching it between the third plate 176 and the second plate 128. As shown in FIG. 2, C-shaped apertures 202 and 204 are provided in the third plate 176 and the second plate 128, respectively. The extending arms 206 formed in the C-shaped apertures receive loops formed on opposing ends of the coil spring 200.

One corner 208 of the third plate 176 is formed with a downwardly extending ear 210. The ear 210 is provided with an aperture 212 for receiving a pin 214. A collar 216 is received around the pin 214 to form a cam follower surface for cooperating with the cam 104. When the third plate 176 is rotatably mounted with respect to the second plate 128, the collar 216 extends downwardly from the bottom surface of the second plate 128 through an aperture 218 (FIG. 2) in the second plate.

The collar 216 forms a cam follower and cooperates with the cam 104 to allow the prism mount assembly 134 to either be raised as shown in FIG. 7 or in a lower position as shown in FIG. 6. More specifically, the collar or cam follower 216 rides along the top surface 222 of the cam 104 when the third plate 176 is allowed to rotate clockwise. When the stop means 190 engages the top surface of the second plate 128 the collar 216 is disposed intermediate the cam surfaces 222 and 224. When the collar 216 is in engagement with the raised portion 222 of the cam 104. This causes counterclockwise rotation of the second plate 178 which, in turn, allows the prism mount assembly 134 to move downwardly by gravity which, in turn, causes a portion of the image rotation prism 34 to extend into the projection lens barrels 234, 236. When the lens selection lever 36 is in the first position 89 a portion of the image rotation prism 34 extends into the prism rotation and lift assembly 126 in the first position 89, it is necessary to lift the image rotation prism 34 and corresponding prism mount assembly 134 before the movable plate 62 is moved in a direction toward the second position 91. This capability is provided in part by the rectangular aperture 82 in the selection lever 36. Since the lens selection lever 36 is fixedly attached to the cam 104, movement of the selection lever 36 causes movement of the cam 104. However, because of the aperture 82 provided in the lens selection lever 36, the movable plate 62 will not be displaced until the shank 85 of the washer 83 engages the left hand wall 88 of the slot 82. Thus, when the lens selection lever 36 is in a first position 89, the third plate 176 will be in a position such hat the flat disc portion 146 of the prism mount assembly 134 directly engages the second collar 138, which corresponds to the downward most position of the image rotation prism 34. In this position, the collar 216 is in engagement with the raised surface 222 of the cam 104. Initially in the first position 89, the shank 85 engages and is moved from the right hand wall 102 to the left hand wall 88 of the slot 82. This causes movement of the cam 104 along the guide track 106 such that the collar 216 is disposed upon the cam surface 222 causing the lifting arms 188 to raise the prism mount assembly 134 so that the bottom of the image rotation prism 34 does not extend into the projection lens barrel 234, 236 to allow free movement of the movable plate 62 in a direction toward the second position 91.

A focus control knob 226 is provided on the front face 40 of the bezel 22. The focus control knob 226 is coupled to a shaft 228 which extends inwardly into the bezel 22 through an aperture 227. The inwardly projecting portion of the shaft 228 is received in a U-shaped aperture 229 provided in an upstanding leg 230 integrally formed with the elongated base 58. A pulley 232 is provided on the end of the shaft 228.

The focusing is accomplished by varying the vertical distance of the lenses 30 or 32 when aligned with the image projection path 28 from the image plane 24. Lens barrels 234 and 236 are received into the cylindrical members 70 and 72, respectively, of the lens holder assembly 68. The lens barrels 234 and 236 are threaded at one end 238 and are flared at the other end 240. The flared end 240 of the lens barrels 234 and 236 are also formed with a radially extending lip 242.

Coil springs 244 and 246 are provided having an inner diameter larger than the outer diameter of the lens barrels 234 and 236. The lens barrels 234 and 236 are inserted inside the coil springs 244 and 246 from the end 238 such that one end of the coil springs 244 and 246 seats against the lip 242 at the flared end 240 of the lens barrels 234 and 236. The assembly of the lens barrels 234 and 236 together with the coil springs 244 and 246 are inserted into the cylinders 70 and 72 of the lens holder assembly 68 from the bottom. Threaded inserts 248 and 250 are screwed into the lens barrels 234 and 236, respectively. More specifically, the threaded inserts 248 and 250 have an extended shank which is threaded and adapted to mate with the threads of the lens barrels 234 and 236. The top side of the threaded inserts 248 and 250 have an enlarged diameter portion 252 which has a larger diameter than the diameter of the movable plate 62. The enlarged diameter portion 252 thus seats against the top surface of the movable plate 62 and holds the assembly in place. The coil springs 244 and 246 bias the lens barrels 234 and 236 downwardly. The enlarged diameter portions 252 of the threaded inserts 248 and 250 are formed with gears 254 around the outer periphery. When one of the lens barrels 234 or 236 is moved into the image projection path 28, its gear 254 will mesh with another gear 256. The gear 256 is disposed adjacent the image projection path 28 and is mounted on a post 258. A pulley 260 is integrally formed with the gear 256. The pulley 260 cooperates with the pulley 232 by way of a power transmission means or drive belt 259 such that rotation of the focus control knob 226 will cause the gear 256 and the gear 254 to rotate. Coil springs 244, 246 bias the lens barrels 234, 236 downwardly such that they rest on the carriage glass. Since the lenses 30, 32 are carried by the threaded inserts 248, 250, rotation of the gear 254 causes the threaded insert 248 or 250 to be either screwed into or unscrewed from the lens barrels 234 and 236 causing the lenses 30, 32 to rotate to move upwardly or downwardly with respect to the object plane 24. Thus, by rotating the control knob 226 the distance of the lens barrels 234 or 236 from the object plane 24 is varied.

Means are provided to prevent the rotation of the lens barrels 234 and 236 with respect to the cylinders 70 and 72. Although various means may be utilized, a keyway 262 is provided in the cylinders 70 and 72 which cooperates with a key 263 provided on the lens barrels 234 and 236.

In an alternate embodiment, a drive motor 264 is used to rotate the image rotation prism 34. Specifically, the drive motor 264 is mounted on a C-shaped bracket 266 such that the drive motor 264 is raised above the second plate 128. The drive motor 264 includes a downwardly extending shaft 267 defining a rotational axis 268 of the drive motor 264, generally parallel to the image projection path 28. A gear 270 is provided on the end of the shaft 268. The gear 270 cooperates with another gear 272 which is fixedly mounted around the outside perimeter of the second collar 138. A toothed drive belt or power transmission means 274 is coupled between the gears 270 and 272. Thus, when the drive motor 264 is energized, the second collar 138 rotates.

A pin 275 extends radially outwardly from the second collar 138. The pin 275 cooperates with a limit switch 276 to control the operation of the drive motor 264. More specifically, the limit switch 276 is provided with an actuation arm 278 which includes a roller wheel 280 that rides against the outer peripheral surface of the second collar 138. When the pin 275 contacts the actuation arm 278 contacts (not shown) within the limit switch 276 are actuated which indicate the relative angular position of the second collar 138 to the control system.

In all other respects, the alternate embodiment is similar to the first described embodiment. Thus, it should be apparent that an improved multiple lens image rotation device has been disclosed which allows a single prism to be used with a plurality of projection lenses. The system also provides for image rotation. The system can be implemented in a number of ways, all of which are contemplated to be within the scope of the appended claims.

What is claimed and desired to be secured by Letter Patent of the United States is:

1. A microfilm reader apparatus for viewing microfilm having one or more microimages recorded thereon comprising:
   means for receiving a microfilm and positioning the microimages one at a time in an image projection path;
   an image projection system including a projection lamp, one or more mirrors and a viewing screen for projecting said microimage in the image projection path onto a viewing screen;

a base;

first and second projection lenses, carried by lens barrels, mounted on a plate movably mounted with respect to said base and adapted to move in a direction generally perpendicular to the image projection path defining a first position wherein said first projection lens is aligned with said image projection path, and a second position wherein said second projection lens is aligned with said image projection path; and a single prism, reciprocally mounted for upward and downward movement with respect to said image projection path, interlocked to move upwardly or downwardly in said first position or said second position.

2. A microfilm reader apparatus as recited in claim 1 further including means for focusing said one of first or second projection lenses when disposed in said image projection path.

3. A microfilm reader apparatus as recited in claim 1 further including rotation means for carrying said prism and allowing said prism to be rotated about an axis generally coaxial with said image projection path.

4. A microfilm reader apparatus as recited in claim 3 further including a drive motor and power transmission means interconnected between said rotation means and said driver motor for driving said rotation means.

5. A microfilm reader apparatus as recited in claim 1 wherein said prism is at least partially disposed within the lens barrel for said first projection lens when said first projection lens is aligned with said image projection path.

6. A microfilm reader apparatus as recited in claim 1 wherein said first projection lens provides for a relatively higher magnification level than said second projection lens.

7. A microfilm reader apparatus as recited in claim 1 wherein said prism is a dove prism.

8. A microfilm reader apparatus as recited in claim 3 further including means for limiting the amount of rotation of said prism.

9. A microfilm reader apparatus as recited in claim 3 further including means for allowing said prism to move up and down in the image projection path.

10. A microfilm reader apparatus as recited in claim 1 further including means for lifting said prism upwardly before movement of said movable plate from said first position to said second position.

11. A microfilm reader apparatus as recited in claim 1 further including means for biasing said prism upwardly.

12. A microfilm reader apparatus as recited in claim 4 further including means for controlling said drive motor to stop said drive motor after the prism has been rotated by a predetermined amount.

13. A microfilm reader apparatus as recited in claim 4 wherein power transmission means includes a drive belt.

14. A multiple lens image rotation device for a microfilm reader apparatus comprising:

a plate having an aperture and adapted to be fixedly mounted to a microfilm reader apparatus defining a chassis;

a carrier having a plurality of apertures for communicating with the aperture in said chassis, movably mounted with respect to said chassis;

a plurality of projection lenses having different magnification levels;

means for carrying said plurality of projection lenses and communicating with said plurality of apertures in said carrier and at least partially extending through said aperture in said chassis, fixedly mounted with respect to said carrier;

a single prism; and means for carrying said prism and aligning it with an image projection path so that said prism can communicate with one projection lens at a time when one of a plurality of said projection lens is aligned with said image projection path.

15. A multiple lens image rotation device as recited in claim 14 wherein said means for carrying said prism is rotatably mounted about an axis generally coaxial with said image projection path.

16. A multiple lens image rotation device as recited in claim 15 further including means for manually rotating said prism.

17. A multiple lens image rotation device as recited in claim 15 further including a drive motor and power transmission interconnected between said drive motor and said means for carrying said prism.

18. A multiple lens image rotation device as recited in claim 15 further including means for limiting the amount of rotation of said prism.

19. A multiple lens image rotation device as recited in claim 14 wherein said plurality of projection lenses is two.

20. A multiple lens image rotation device as recited in claim 19 wherein said means for carrying said projection lenses includes an elongated barrel for receiving each projection lens, wherein said barrel is such that it is aligned with the aperture in said carrier and extends outwardly from said carrier and further extends at least partially into the aperture provide in said chassis.

21. A multiple lens image rotation device as recited in claim 20 further including means for focusing said projection lenses.

22. A multiple lens image rotation device as recited in claim 21 wherein said focusing means includes means for varying the position of the lens along an axis generally parallel to the image projection path.

23. A multiple lens image rotation device as recited in claim 22 further including means for rendering said focusing means operative only when said projection lens is aligned with said image projection path.

24. A multiple lens image rotation device as recited in claim 20 further including biasing means for biasing said barrels downwardly.

25. A multiple lens image rotation device as recited in claim 23 further including a gear mechanically coupled to each of said barrels which are adapted to engage a drive gear mounted on an elongated post fixedly mounted to said chassis for varying the vertical position of the lens when said lens is generally aligned with said image projection path.

26. A multiple lens image rotation device as recited in claim 25 further including means for rotating said gears.

27. A multiple lens image rotation device as recited in claim 26 wherein said means for rotating said gears includes a shaft and means for coupling said shaft with said drive gear.

28. A multiple lens image rotation device as recited in claim 27 coupling means includes two pulleys wherein one pulley is disposed on said shaft and the other pulley is coupled to said drive gear and a drive belt interconnecting said pulleys.

29. A multiple lens image rotation device as recited in claim 27 wherein said shaft is disposed generally perpendicular to said image projection path.

30. A multiple lens image rotation device as recited in claim 14 further including a lens selection lever and means for allowing said selection lever to be pivotably coupled to said chassis and said carrier for causing movement of said carrier between a first position and a second position.

31. A multiple lens image rotation device as recited in claim 30 wherein said first position corresponds to a relatively high magnification level and said second position corresponds to a relatively low magnification level.

32. A multiple lens image rotation device as recited in claim 30 wherein said means for coupling said lens selection lever to said carrier includes means for allowing said lens selection lever to move a predetermined amount from said first position toward said second position without causing movement of said carrier.

33. A multiple lens image rotation device as recited in claim 32 wherein said allowing means includes a slot disposed in said lens selection lever for receiving a fastener which couples said lens selection lever to said carrier.

34. A multiple lens image rotation device as recited in claim 33 further including biasing means mechanically coupled between said lens selection lever and said carrier.

35. A multiple lens image rotation device as recited in claim 14 further including a cam slidably mounted on said chassis and mechanically coupled to said lens selection lever, said cam adapted to communicate with said means for carrying said prism for causing said prism to move along an axis generally coaxial with said image projection path.

36. A multiple lens image rotation device as recited in claim 35 wherein said means for carrying said prism includes a first plate fixedly mounted and spaced apart from said chassis.

37. A multiple lens image rotation device recited in claim 36 wherein said prism carrying means includes means responsive to said cam for raising said prism relative to said barrels.

38. A multiple lens image rotation device as recited in claim 37 wherein said raising means includes a second plate pivotably mounted with respect to said first plate which pivots about an axis generally perpendicular to said image projection path having a free end which raises said prism.

39. A multiple lens image rotation device as recited in claim 38 further including means for limiting the amount of pivotal movement of said second plate.

40. A multiple lens image rotation device as recited in claim 39 wherein said limiting means is adjustable such that the amount of allowable pivotal rotation can be varied.

41. A multiple lens image rotation device as recited in claim 40 wherein said limiting means includes an elongated threaded fastener disposed within a threaded aperture in said second plate.

42. A multiple lens image rotation device as recited in claim 38 further including biasing means coupled between said first plate and said second plate.

43. A multiple lens image rotation device as recited in claim 38 wherein said prism carrying means includes an aperture disposed in said first plate and a first collar rotatably mounted to said first plate and aligned with said aperture.

44. A multiple lens image rotation device as recited in claim 43 further including a second collar disposed within said first collar and fixedly mounted to said first plate.

45. A multiple lens image rotation device as recited in claim 43 further including means for limiting the amount of rotation of said first collar.

46. A multiple lens image rotation device as recited in claim 45 wherein said limiting means includes a first pin extending radially outwardly from said first collar which cooperates with a second pin mounted generally perpendicular to said first plate.

47. A multiple lens image rotation device as recited in claim 46 further including a third pin perpendicularly mounted with respect to said first plate which cooperates with said first pin for further limiting rotational movement of said first collar.

48. A multiple lens image rotation device as recited in claim 43 further including a prism mount assembly.

49. A multiple lens image rotation device as recited in claim 48 wherein said prism mount assembly includes a disc with a centrally disposed aperture and a third collar fixedly mounted to said disc and aligned with said aperture, said collar upwardly extending outwardly from one side of said disc.

50. A multiple lens image rotation device as recited in claim 49 wherein said prism mount assembly further includes means for compression mounting of said prism within said third collar.

51. A multiple lens image rotation device as recited in claim 49 further including means for interlocking said prism mount assembly with said first collar.

52. A multiple lens image rotation device as recited in claim 51 wherein said interlocking means includes a pin which extends axially outwardly from said first collar which cooperates with an aperture in said disc.

53. A multiple lens image rotation device as recited in claim 52 further including means for rotating said first collar.

54. A multiple lens image rotation device as recited in claim 53 wherein said rotating means includes a shaft having a resilient disc mounted thereon for cooperating with said first collar to cause rotation of said first collar when said shaft is rotated.

55. A multiple lens image rotation device as recited in claim 54 wherein said first collar and said resilient disc are in friction contact.

56. A multiple lens image rotation device as recited in claim 55 wherein said shaft and said resilient disc are mounted about an axis generally perpendicular to said image projection path.

57. A multiple lens image rotation device comprising:
a base;
a pair of lenses having different magnification levels;
means for movably mounting said pair of lenses along an axis generally parallel to the longitudinal axis of said base defining a first position, wherein one lens is aligned with an image projection path and a second position, wherein the other lens is aligned with the image projection path about an axis generally parallel to said image projection path; and
a single prism movably mounted in said image projection path which cooperated with each of the lenses in said pair of lenses.

* * * * *